July 24, 1951 W. D. TEAGUE, JR 2,561,957
GAS TO HYDRAULIC PRESSURE TRANSMITTER OR ACCUMULATOR
Filed Oct. 13, 1947
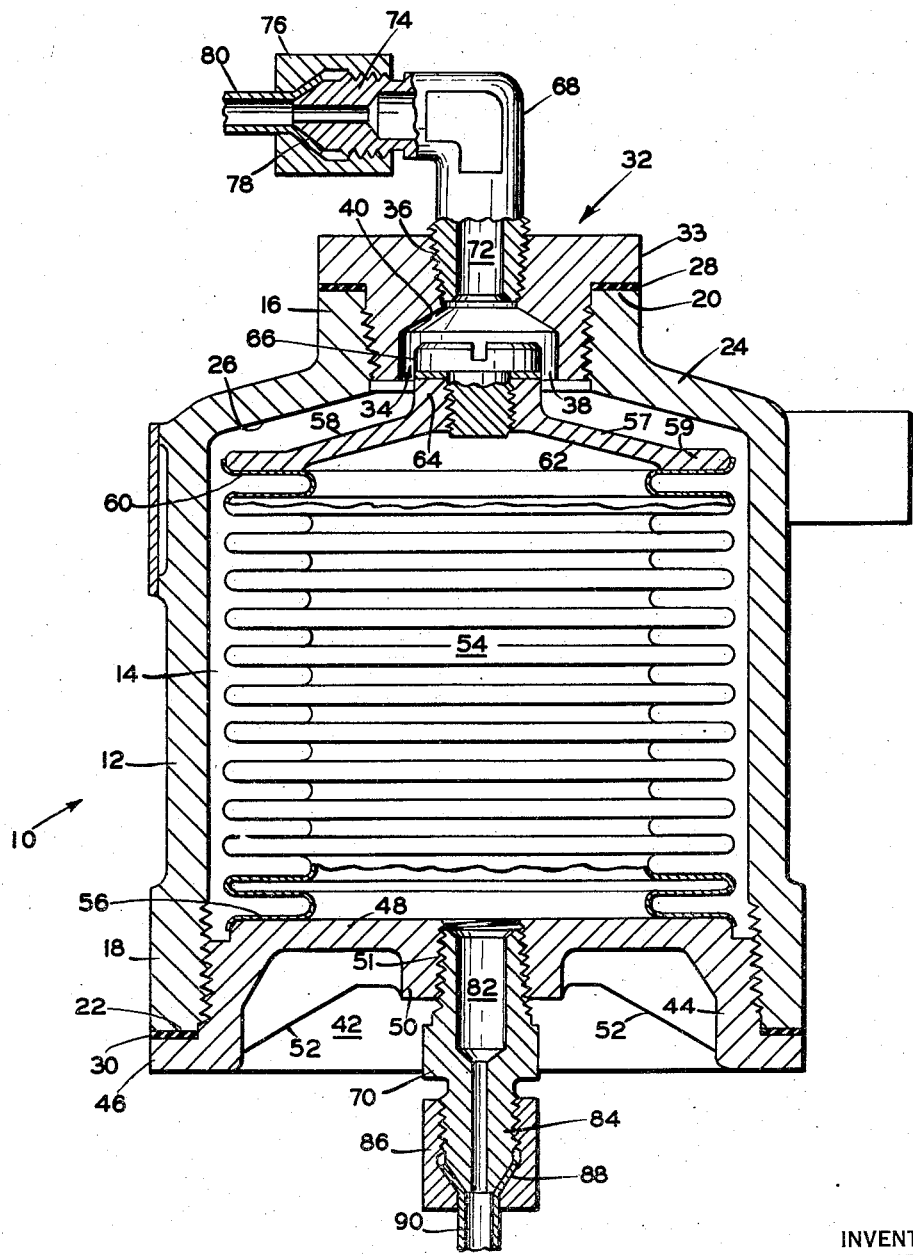
INVENTOR
WALTER D. TEAGUE JR.
BY Frederic H. Miller
ATTORNEY Patented July 24, 1951

2,561,957

UNITED STATES PATENT OFFICE 2,561,957

GAS TO HYDRAULIC PRESSURE TRANSMITTER OR ACCUMULATOR

Walter Dorwin Teague, Jr., Alpine, N. J., assignor to Bendix Aviation Corporation, Teterboro, N. J., a corporation of Delaware Application October 13, 1947, Serial No. 779,543

1 Claim. (Cl. 60—54.6)

1

This invention relates to pressure transmitters or accumulators, and particularly to a unit for transmitting pressure between different fluids, as between a gas such as air and a liquid such as hydraulic fluid.

An example of one application of the unit of the invention is in operating a propellant valve piston on a rocket motor propellant valve.

In such application, one prior means, for performing the general operation of the unit hereof, is in the form of a cylinder and piston device, in which, after periods of inactivity, the piston may stick to the cylinder, which is subject to leakage past the piston O-ring seal. The latter is of unpredictable sealing characteristics, the cylinder surface requires careful machining, such as honing, a spring is required to oppose fluid pressure operation of the piston, friction occurs between the piston and the cylinder, and other disadvantageous features are present.

Another prior means has the disadvantage that, under certain conditions of aircraft operation, the gas and liquid mix with each other, so that such means is not effective.

Among the objects of the invention are to overcome all of the disadvantages of prior devices, to provide a unit or device of the character stated which is particularly effective for operation on aircraft and the like, is frictionless, has movement more rapidly and freely responsive to forces for moving it, renders possible the production of a closed fluid system having an absolute and predictable seal between different fluids, transmits movement between the fluids while maintaining the seal absolute, avoids the entrapment of bubbles, operates effectively irrespective of conditions such as altitude, position and acceleration, is prevented from injury and wear caused by foreign matter, is light in weight, small in size, of easy servicing, and has other advantages.

Another object is to render the device simple and durable in construction, economical to manufacture and effective in its operation.

The above and other objects and features of the invention will appear more fully hereinafter from a consideration of the following description taken in connection with the accompanying drawing wherein one embodiment of the invention is illustrated by way of example.

In the drawing:

The single figure is a side view generally in section of a transmitter constructed in accordance with the invention.

Referring to the drawing, a fluid-tight housing

2

10 comprises a cylindrical main body 12 forming a chamber 14 and including internally screw threaded end lengths 16 and 18 having annular radial shoulders 20 and 22, respectively, and one of which, namely the length 16, constitutes a constricted neck joined to the body 12 by an annular wall 24 and an inner surface 26 of the wall of substantially frusto-conical or dome-shape converging from the body 10 to the neck 16. Gaskets 28 and 30 are disposed on the shoulders 20 and 22, respectively.

A plug 32, threaded into the neck 16, has a flange 33 against the gasket 28 of the corresponding shoulder 20, and forms a gas conduit 34 having an internally screw threaded constricted outer end bore section 36, and an enlarged inner end cavity 38 converging along a conical surface 40 into the bore section 36.

A closure 42, for the other end 18 of the body 12, comprises a hollow cylindrical member 44 threaded into the end 18 with a flange 46 against the adjacent gasket 30 and includes, at the inner end of the closure 42, a disc-like partition 48 embodying an outwardly axially extending liquid-conducting nipple 50 which has an internally screw threaded bore section 51 and is joined to the cylindrical member 44 by radial reinforcing ribs 52.

Movable means, in this instance, a cylindrical bellows 54 extending axially in the chamber 14, is constructed of beryllium copper having low hysteresis and dependable spring characteristics, and has an end 56 around the conduit 50 sealed to the partition 48, as by soldering.

An annular cover or end plate 57, floating on the bellows 54, has an outer surface 58 substantially conforming to the surface 26, and includes an outer radial-plane perimeter 59 sealed, as by soldering, to the other end 60 of the bellows 54. The plate 57 has an under surface 62 of substantially dome shape, and an inlet head 64, protruding outwardly from the bellows 54 toward the cavity 38, and provided with a closure or stopper bleed screw cap 66 which, in the null pressure condition of the bellows 54 shown is located in the cavity 38. Conduit coupling means 68 and 70 are associated with the bore sections 36 and 51, respectively. The means 68 includes an end element 72 threaded into the corresponding bore section 36, an end element 74 adapted to accommodate a nut 76 for clamping an enlarged frusto-conical end 78 of a liquid-conducting conduit 80. The means 70 includes an end element 82 threaded into the corresponding bore section 51, an end element 84 adapted to accommodate a nut 86 for clamping an enlarged frusto-conical end 88 of a gas conducting conduit 90.

In installation, the conduit 90 is connected, as to the actuating cylinder of the above-mentioned rocket motor propellant valve, and the outer chamber 14 is connected to a gas feed system.

Before operation, the plug 32 and the bleed screw 66 are removed, and a valve bleed screw (not shown) loosened at the aforesaid propellant valve. The accumulator bellows 54, and the cylinder at the propellant valve, are next filled with hydraulic fluid, subsequent to which, the bleed screws are replaced and tightened, and the plug 32 is replaced, thus conditioning the unit for operation.

The under surface 62 is formed of dome shape, such as indicated, so that, in filling the hydraulic side of the system through the inlet head 64 of the bellows 54, with the unit in vertical position and the head 64 at the top, entrapment of bubbles under the cover 57 is prevented.

In operation, when high gas pressure is applied to the unit, through the conduit 80, into the chamber 14, the bellows 54 is compressed, so that, since the system including the bellows and the conduit 90 to the propellant cylinder, is entirely filled with the hydraulic fluid, the propellant valve piston is substantially instantaneously operated. The capacity of the bellows 54 is sufficient to accommodate the piston displacement of the propellant valve cylinder.

By the construction and material of the bellows 54, the latter is its own spring, biasing it against the gas pressure in a more permanent and dependable way than with a separate spring. By the relation of the bellows 54 to the other parts, friction is reduced to substantially a minimum. The relation of the cavity 38 to the screw 66 and to the head 64, as well as the relation of the surface 58 to the surface 26, shorten the length of the unit and render it very easy to service. All of the other advantages mentioned are attained in novel manner rendering the unit a distinct advance in its field.

Although only one embodiment of the invention has been illustrated and described, various changes in the form and relative arrangements of the parts may be made to suit requirements.

What is claimed is:

A device for transmitting pressure from a gaseous medium to a liquid medium for applying an operating pressure to a liquid pressure operated mechanism; the combination comprising a fluid tight housing including a main body forming a chamber and an end length constituting a constricted neck joined to the body by a wall of substantially frusto-conical dome shape converging from the body to the neck; a plug threaded into said neck in sealed relation thereto and providing a conduit for a gaseous medium, a closure plate for the other end of said body and including a conduit for a liquid medium, said liquid conduit opening through the closure plate; a bellows in said chamber sealed to said closure plate and about the opening of said liquid conduit, said bellows being formed of a material having spring characteristics acting in opposition to the pressure of the gaseous medium and whereby said bellows is normally fully extended; a cover plate of substantially frusto-conical dome section conforming to said wall and floating on and sealed to the bellows, a liquid inlet head in said cover plate and opposite said gas conduit whereby liquid may be introduced into said bellows, a stopper for said inlet head accessible for removal through said neck, and conduit coupling means including an element cooperating with each of said gas and liquid conduits, whereby a gaseous medium in said chamber under pressure applied through said gas conduit may compress said bellows to transmit such pressure to the liquid medium within said bellows and liquid conduit for effecting operation of the liquid pressure operated mechanism.

WALTER DORWIN TEAGUE, JR.

REFERENCES CITED

The following references are of record in the file of this patent:

UNITED STATES PATENTS

| Number | Name | Date |
| --- | --- | --- |
| 1,875,732 | Holttum | Sept. 6, 1932 |
| 2,038,898 | Goodyear | Apr. 28, 1936 |
| 2,078,209 | Sanford | Apr. 20, 1937 |
| 2,095,752 | LaBrie | Oct. 12, 1937 |

FOREIGN PATENTS

| Number | Country | Date |
| --- | --- | --- |
| 547,062 | France | Sept. 11, 1922 |